Figure 5:
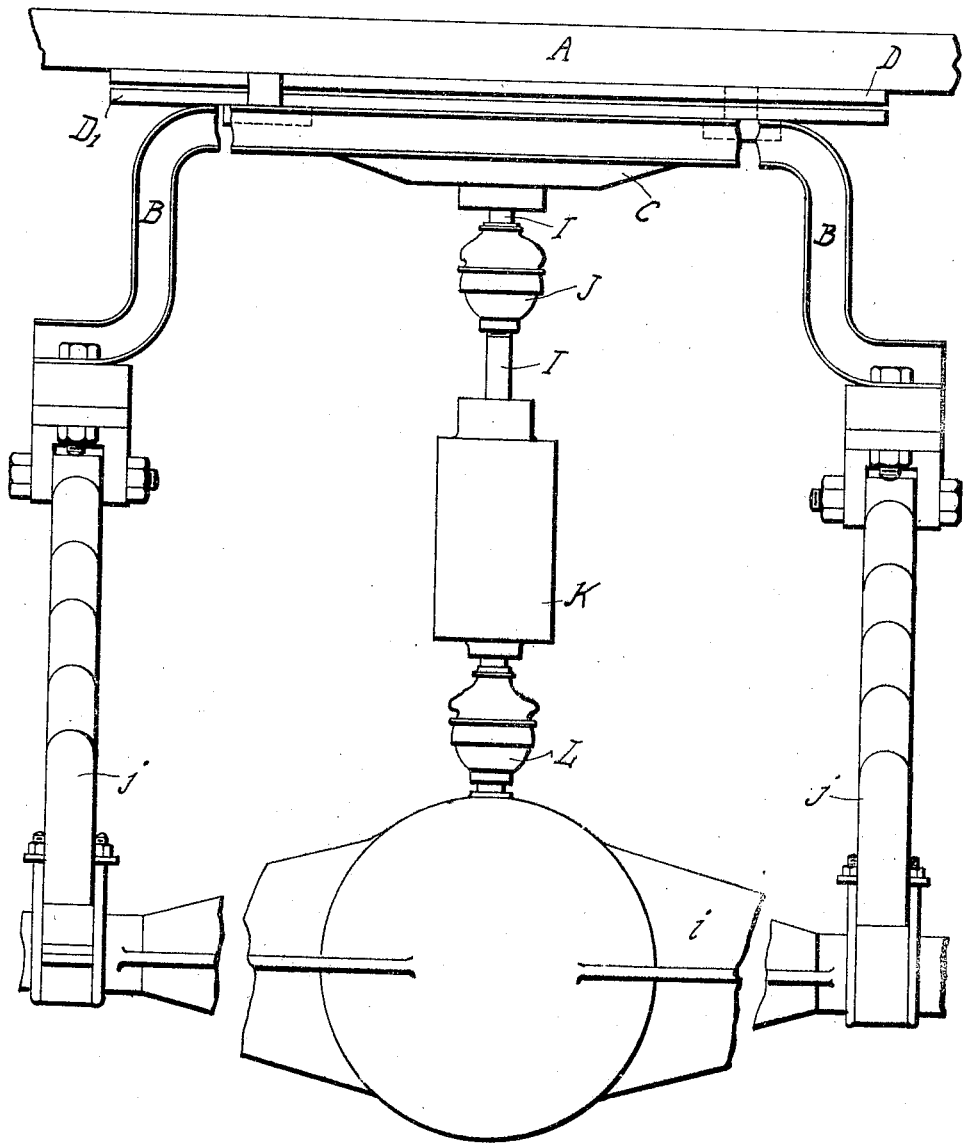

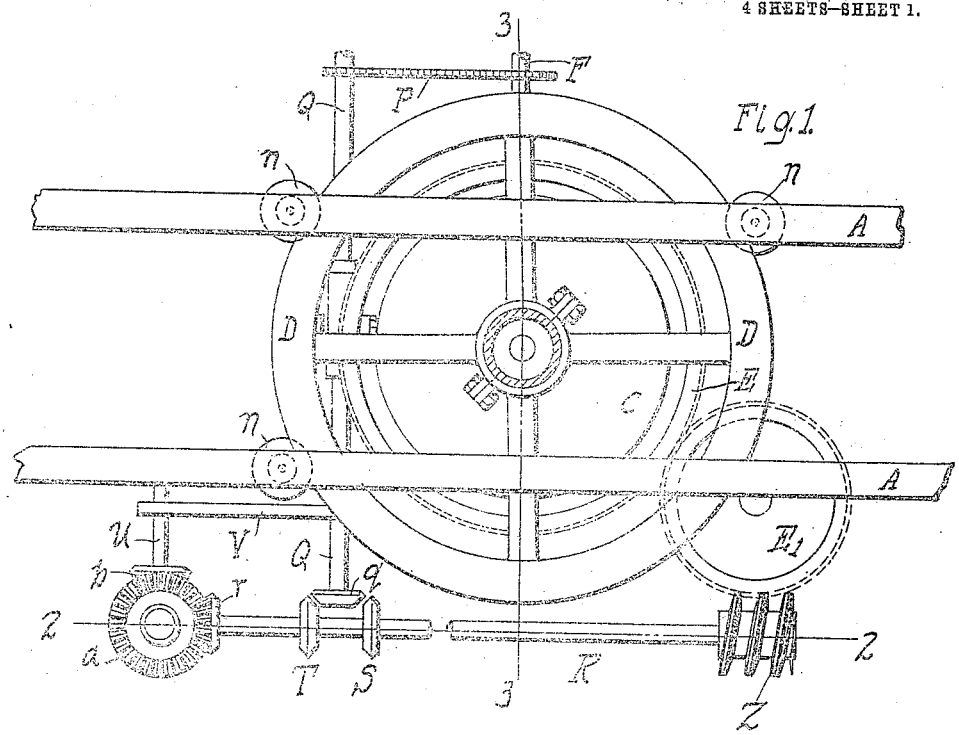

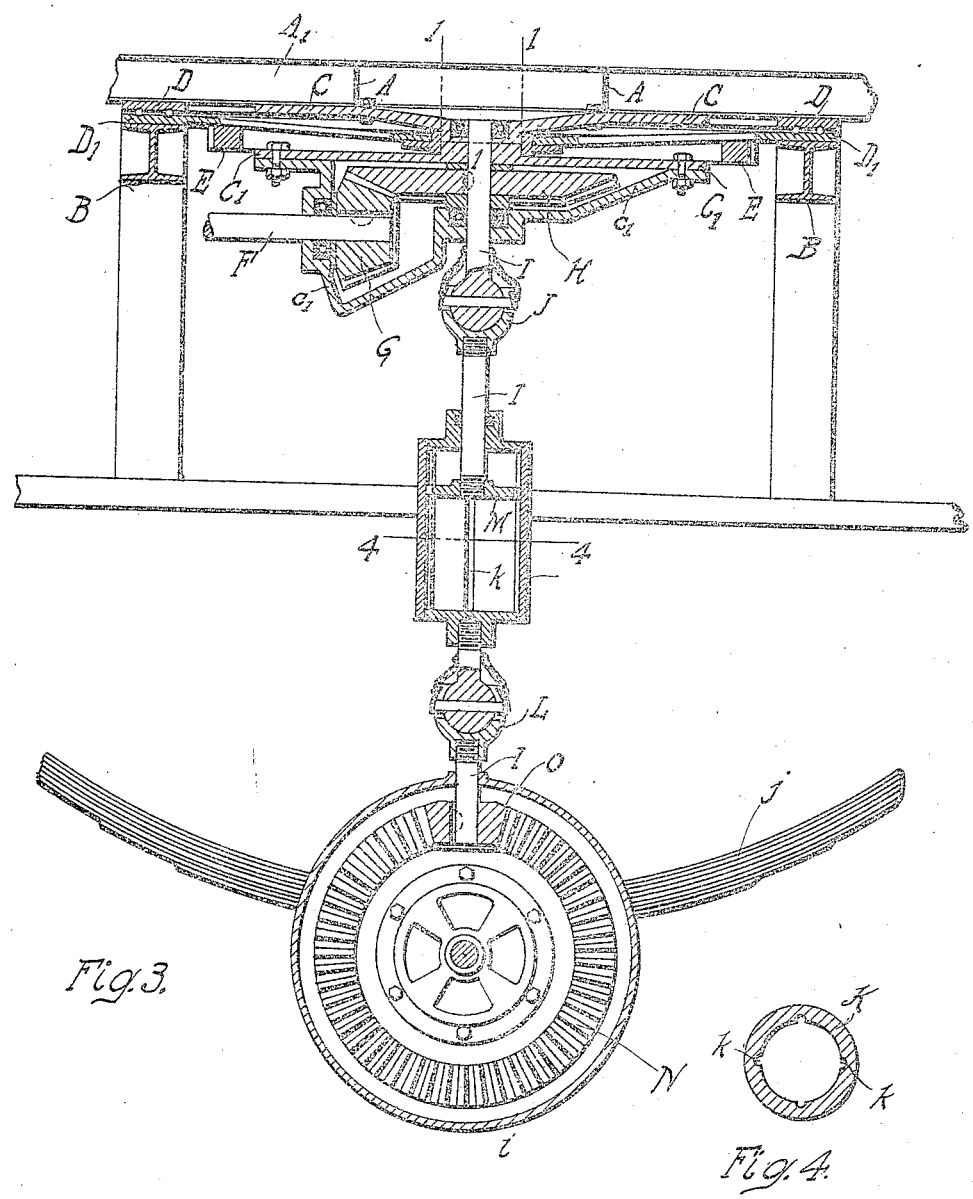

J. H. HAND.
AUTOMOBILE.
APPLICATION FILED APR. 1, 1912.
1,065,357.
Patented June 24, 1913.
4 SHEETS—SHEET 4.
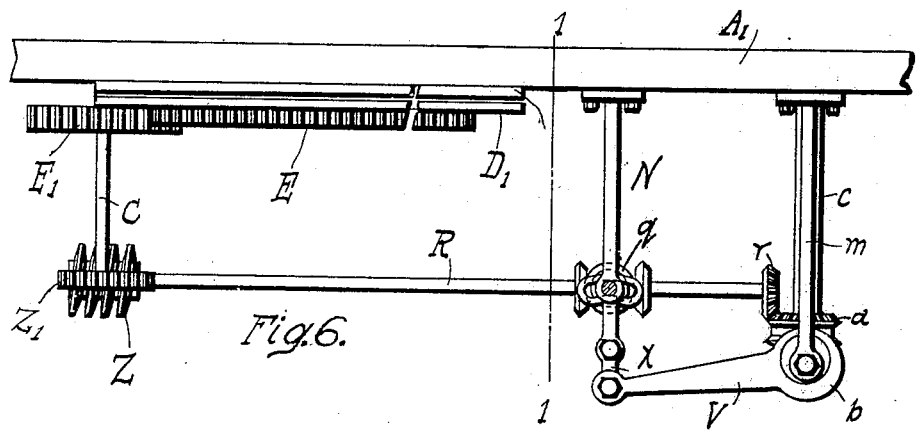
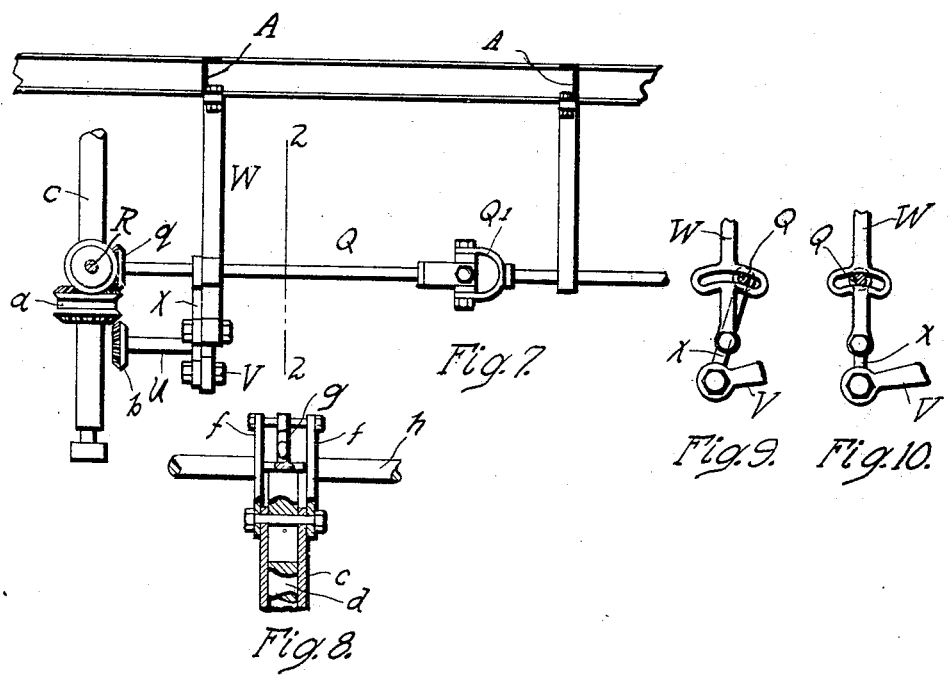

UNITED STATES PATENT OFFICE.

JESSE H. HAND, OF ANN ARBOR, MICHIGAN.

AUTOMOBILE.

1,065,357. Specification of Letters Patent. Patented June 24, 1913.

Application filed April 1, 1912. Serial No. 687,670.

*To all whom it may concern:*

Be it known that I, JESSE H. HAND, a citizen of the United States, residing at Ann Arbor, county of Washtenaw, State of Michigan, have invented a certain new and useful Improvement in Automobiles, and declare the following to be a full, clear, and exact description of the same, such as will enable others skilled in the art to which it pertains to make and use the same, reference being had to the accompanying drawings, which form a part of this specification.

My invention relates to automobiles and has for its object to provide an improved automobile and one in which the axle is turned to direct the course of the same while the wheels on said axle may be driven and in which the steering may be effected either by hand or power.

I accomplish this object in the device illustrated in the accompanying drawings, in which, Figure 1, is a plan view of a part of an automobile embodying my invention. Fig. 2, is a side view of the same. Fig. 3, is a section on the line 3—3 Fig. 1. Fig. 4, is a detail sectional view on the line 4—4 Fig. 3. Fig. 5, is an elevation looking from a direction at right angles to that of the plane of section of Fig. 3. Fig. 6, is a side elevation of a portion of an automobile embodying my invention. Fig. 7, is an elevation looking from the right of Fig. 6. Fig. 8, is a detail view partly in section of the upper parts of the post and sleeve $c$ $d$ and parts adjacent thereto. Fig. 9, is a detail view illustrating the method of hanging, and the operation of, the shaft Q. Fig. 10, is a view similar to Fig. 9 showing the rocking lever X in a different position.

$A^1$ indicates the side pieces of the chassis or frame of an automobile and A A indicate the cross pieces.

B B are cross pieces bent downward at their ends and serving for parts to which the springs $j$ $j$ are secured.

C, is a casting secured to the cross pieces A A extending downward in a neck or small cylinder coaxial therewith and then extending outward in the flange $C^1$ $C^1$.

D D is an annulus or flat ring secured to the frame of the automobile and having at its under surface circular grooves to serve as runways or races for balls forming a ball joint.

$D^1$, is a second annulus similar to D D located coaxial therewith and below the same and provided with corresponding grooves or runways for balls so that a ball joint is formed between the annuli D $D^1$. The annulus $D^1$ rests upon and is secured to the cross pieces B B. There are radial arms extending from the annulus $D^1$ toward its center and joining a sleeve which turns upon the neck joining the parts C $C^1$ of the above described casting (Fig. 3).

$n$ $n$ $n$ are friction rollers which serve as guides to more accurately center the plates D $D^1$ and direct the movement of the latter.

E, is a gear wheel or segment secured to the radial arms of the annulus $D^1$. Below the part $C^1$ of the casting C $C^1$ is a housing or casing $c^1$.

F, is a shaft bearing in the casing $c^1$ and having a bevel gear wheel on its end within said housing.

I, is a vertical shaft bearing in the casting C $C^1$ and housing $c^1$ and having a bevel gear wheel H thereon, the teeth of which engage the teeth of the bevel gear wheel G.

J L are universal joints in the shaft I I, said shaft is divided into two parts, which are in line with each other and are joined by a slip joint K which consists of a cylinder attached to the lower part of said shaft and having a groove $k$ in its inner wall and a piston fitting loosely in said cylinder attached to the upper section of said shaft within said cylinder. The cylinder is filled with oil and is provided with a stuffing box surrounding the shaft I at the upper end of said cylinder. The springs $j$ $j$ are secured at their upper parts to the cross pieces B and at their lower parts to the axle housing I, in which housing is the usual divided axle formed of two sections united by the usual differential gear which as it is well understood in the art, it is not necessary to show and describe.

In Fig. 3 N is a bevel gear upon one of the sections of the axle and O is a bevel gear on the lower end of the shaft 1, its teeth engaging the teeth of the bevel gear wheel N.

$E^1$, is a pinion on the upper end of the shaft $e$, its teeth engaging the teeth of the gear wheel E.

$Z^1$ (Fig. 2) is a worm gear wheel on the lower end of the shaft $e$, and $z$ is a worm, its threads engaging the teeth of the worm wheel $Z^1$.

R, is a shaft upon which is keyed the worm Z.

S and T are bevel friction wheels spaced the proper distance from each other and fixed upon the shaft R.

Q, is a shaft extending at right angles to and in the plane of the shaft R provided with a universal joint $Q^1$ (Fig. 7) and with a bevel friction wheel $q$ at its end adjacent to the shaft R, which bevel friction wheel is adapted to mesh with either of the bevel friction wheels S or T but not with both.

P, is a train of gear wheels connecting the driving shaft F with the shaft Q so that the shaft Q is in continuous rotation when the automobile is being driven, or a sprocket chain and wheels may unite said shafts. The end of the shaft Q which is adjacent to the shaft R is supported by a hanger W in a slot $x$ in said hanger (Figs. 7, 9 and 10).

X, is a rocking lever pivoted to the lower end of the hanger W, its upper end engaging the shaft Q.

V, is an eccentric rod, one end of which is pivoted to the lower end of the rocking lever X, the other end is provided with an eccentric strap passing around an eccentric on the shaft U.

$d$, is a vertical steering post having a steering wheel $h$ at its upper end.

$c$, is a sleeve surrounding the steering post $d$.

$a$, is a double bevel gear wheel keyed upon the sleeve $c$ so as to be fixed in place thereon, its key extending into a longitudinal groove in the post $d$.

$f$ $f$, are links pivoted at their lower ends to the sleeve $c$ and at their upper ends to an eccentric connected with the lever $g$ by manipulating the lever $g$ the longitudinal position of the sleeve $c$ upon the post $d$ may be adjusted.

$b$, is a gear wheel on the end of the shaft U. The gear wheels $r$ and $b$ are so located that when the sleeve $c$ is at the upper end of its travel, its teeth shall engage the teeth of the bevel gear wheel $r$, and when at the lower part of its travel, its lower teeth engage the wheel $b$.

When the bevel gear wheel $a$ engages the bevel gear wheel $r$ when the hand wheel $h$ is turned, the shaft R will be rotated, which will actuate the worm gear wheel $Z^1$ by means of the worm Z which will carry with it the pinion $E^1$, which will act to turn the gear wheel E, which will carry with it the cross pieces D B, springs $j$ $j$, and axle I to direct the course of the vehicle. When the sleeve $d$ is in the lower part of its stroke, its teeth will engage the teeth of the bevel gear wheel $b$ and when thus arranged a turning of the hand wheel $h$ will act to rotate the shaft U actuating the casing rod V and carrying the bevel gear wheel $q$ into engagement with the bevel gear wheel S or T as desired. The shaft Q continually rotating will then rotate the shaft R in one direction or the other according to which of the gear wheels S or T the gear wheel Q is in engagement with, thus actuating the train of gears above specified to turn the axle housing $i$ to direct the course of the vehicle. Thus the steering may be accomplished by hand or by power as desired. The power shaft F actuates the shaft I through the bevel gear wheels G and H which turns the differential casing through the gear wheels O and N thus rotating the axle while leaving its constituent parts free to turn independent of each other.

What I claim is:—

1. In an automobile, having an axle adapted to turn about a vertical axis at its center, a segment connected with said axle so as to turn the same, a shaft connected with said segment by gearing, a power shaft, a third shaft adapted to be actuated by said power shaft, wheels S and T on the first mentioned shaft, a wheel $q$ on the shaft driven from the power shaft, and means for moving the last named shaft between said wheels to engage one or the other to turn the shaft connected with said shaft in one direction or the other at will.

2. In an automobile, an axle adapted to turn about a vertical axis at its center, a segment connected with said axle to turn the same, a shaft R geared to said segment to actuate the same, a gear wheel $r$ on the shaft R, a steering post, a shaft Q, wheels S and T on the shaft R, a wheel $q$ on the shaft Q located between the wheels S and T, the shaft Q being adapted to be actuated to engage the wheel S or the wheel T by means of the wheel Q, a shaft U adapted to actuate the shaft Q to cause the engagement with the wheels S and T, a wheel $b$ on the shaft U and a wheel $a$ on said steering post adapted to be moved to engage the wheel $r$ on the wheel $b$, and means for connecting the shaft Q with the power shaft.

In testimony whereof, I sign this specification in the presence of two witnesses.

JESSE H. HAND.

Witnesses:
LOTTA LEE BRAY.
ELLIOTT J. STODDARD.